US006854268B2

(12) United States Patent
Fales et al.

(10) Patent No.: US 6,854,268 B2
(45) Date of Patent: Feb. 15, 2005

(54) HYDRAULIC CONTROL SYSTEM WITH ENERGY RECOVERY

(75) Inventors: Roger Clayton Fales, Ames, IA (US); Francis J. Raab, Chillicothe, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 83 days.

(21) Appl. No.: 10/310,986

(22) Filed: Dec. 6, 2002

(65) Prior Publication Data

US 2004/0107699 A1 Jun. 10, 2004

(51) Int. Cl.[7] ................................................ F16D 31/02
(52) U.S. Cl. ........................................... 60/414; 91/454
(58) Field of Search ..................... 60/414, 417; 91/454; 417/225

(56) References Cited

U.S. PATENT DOCUMENTS

| | | | | |
|---|---|---|---|---|
| 3,971,215 A | | 7/1976 | Baron et al. | 60/403 |
| 4,098,144 A | | 7/1978 | Besel et al. | 74/687 |
| 4,204,405 A | | 5/1980 | Basham | 60/371 |
| 4,458,791 A | | 7/1984 | Schneider et al. | 188/170 |
| 4,528,814 A | | 7/1985 | Stuhr | 60/419 |
| 4,674,280 A | | 6/1987 | Stuhr | 60/413 |
| 4,693,080 A | | 9/1987 | Van Hooff | 60/414 |
| 4,731,997 A | | 3/1988 | Hagin | 60/416 |
| 4,745,745 A | | 5/1988 | Hagin | 60/414 |
| 4,974,994 A | | 12/1990 | Kirstein et al. | 405/79 |
| 5,329,767 A | | 7/1994 | Hewett | 60/475 |
| 5,477,677 A | | 12/1995 | Krnavek | 60/414 |
| 5,579,868 A | | 12/1996 | Pelto-Huikko | 187/275 |
| 5,794,440 A | | 8/1998 | Lisniansky | 60/414 |
| 5,794,442 A | | 8/1998 | Lisniansky | 60/414 |
| 5,878,569 A | | 3/1999 | Satzler | 60/418 |
| 6,009,708 A | | 1/2000 | Miki et al. | 60/414 |
| 6,092,455 A | | 7/2000 | Endsley et al. | 92/71 |
| 6,151,894 A | | 11/2000 | Endo et al. | 60/414 |
| 6,223,529 B1 | | 5/2001 | Achten | 60/416 |
| 6,370,873 B1 | * | 4/2002 | Schaich et al. | 60/413 |

FOREIGN PATENT DOCUMENTS

| | | |
|---|---|---|
| WO | WO 97/31185 | 8/1997 |
| WO | WO 00/00748 | 1/2000 |

OTHER PUBLICATIONS

Achten, Peter A. J., et al., "Transforming Future Hydraulics: A New Design of a Hydraulic Transformer," University of Linköping, Sweden, pp. 1–24, 1997.

Werndin, Ronnie, et al., "Efficiency Performance and Control Aspects of a Hydraulic Transformer," The Sixth Scandinavian International Conference on Fluid Power, Tampere, Finland, pp. 395–407, May 26–28, 1999.

* cited by examiner

*Primary Examiner*—Edward K. Look
*Assistant Examiner*—Michael Leslie
(74) *Attorney, Agent, or Firm*—Finnegan, Henderson, Farabow, Garrett & Dunner

(57) ABSTRACT

A fluid control system may include a pump, a tank, and an actuator. A valve assembly may be configured to control fluid communication between the actuator, the tank, and the pump. An energy recovery circuit, including a pressure transformer, may be fluidly coupled to the actuator in parallel with the valve assembly.

22 Claims, 2 Drawing Sheets

HYDRAULIC CONTROL SYSTEM WITH ENERGY RECOVERY

TECHNICAL FIELD

The invention relates generally to a fluid control system and, more particularly, to a hydraulic control system having energy recovery capability.

BACKGROUND

Conventional hydraulic systems, for example, those implemented in mobile handling machines such as large excavators, forego the opportunity to recover energy from the fluid for regeneration through the system. For example, when pressurized fluid passes through a control valve to tank, energy is converted to heat in the hydraulic fluid. The heat must then be removed by supplying operational energy to a cooling system, such as a radiator and fan. Additionally, heating and re-heating of hydraulic fluids to undesirable temperatures has an adverse affect on the performance of the fluids.

Some conventional hydraulic systems include an energy recovery facility. For example, the mobile working machine described in International Publication No. WO 00/00748 has a hydraulic circuit that includes an energy recovery facility. The hydraulic circuit may recover lowering load energy from hydraulic fluid by way of a pump/motor in communication with an accumulator. However, the hydraulic circuit can only recover energy from the head end of an actuator, and in some circumstances the machine drive unit must supply operational energy to the pump/motor in order to recover the lowering load energy.

A fluid control system for reducing the energy requirement of a hydraulic circuit and for effectively and efficiently providing energy recovery capability to a hydraulic circuit is desired. The present invention is directed to solving one or more of the problems set forth above.

SUMMARY OF THE INVENTION

According to one optional aspect of the invention, a fluid control system may include a pump, a tank, and an actuator. A valve assembly may be configured to control fluid communication between the actuator, the tank, and the pump. An energy recovery circuit, including a pressure transformer, may be fluidly coupled to the actuator in parallel with the valve assembly.

According to another optional aspect of the invention, a fluid control system may include a pump, a tank, and an actuator. An independent metering valve arrangement may be configured to control fluid communication between the actuator, the tank, and the pump. An energy recovery circuit may be fluidly coupled to the actuator in parallel with the valve assembly.

According to yet another optional aspect of the invention, a method is provided for operating a fluid control system including a pump, a tank, and an actuator having a head end chamber and a rod end chamber. The method may include operating a valve assembly to control fluid communication between the actuator, the tank, and the pump. The method may also include receiving a first fluid flow from one of the head end chamber and the rod end chamber and transforming the first fluid flow of a first pressure to a second fluid flow of a second pressure by either supplying or discharging a third fluid flow of a third pressure. The second fluid flow may be directed to an energy storage device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
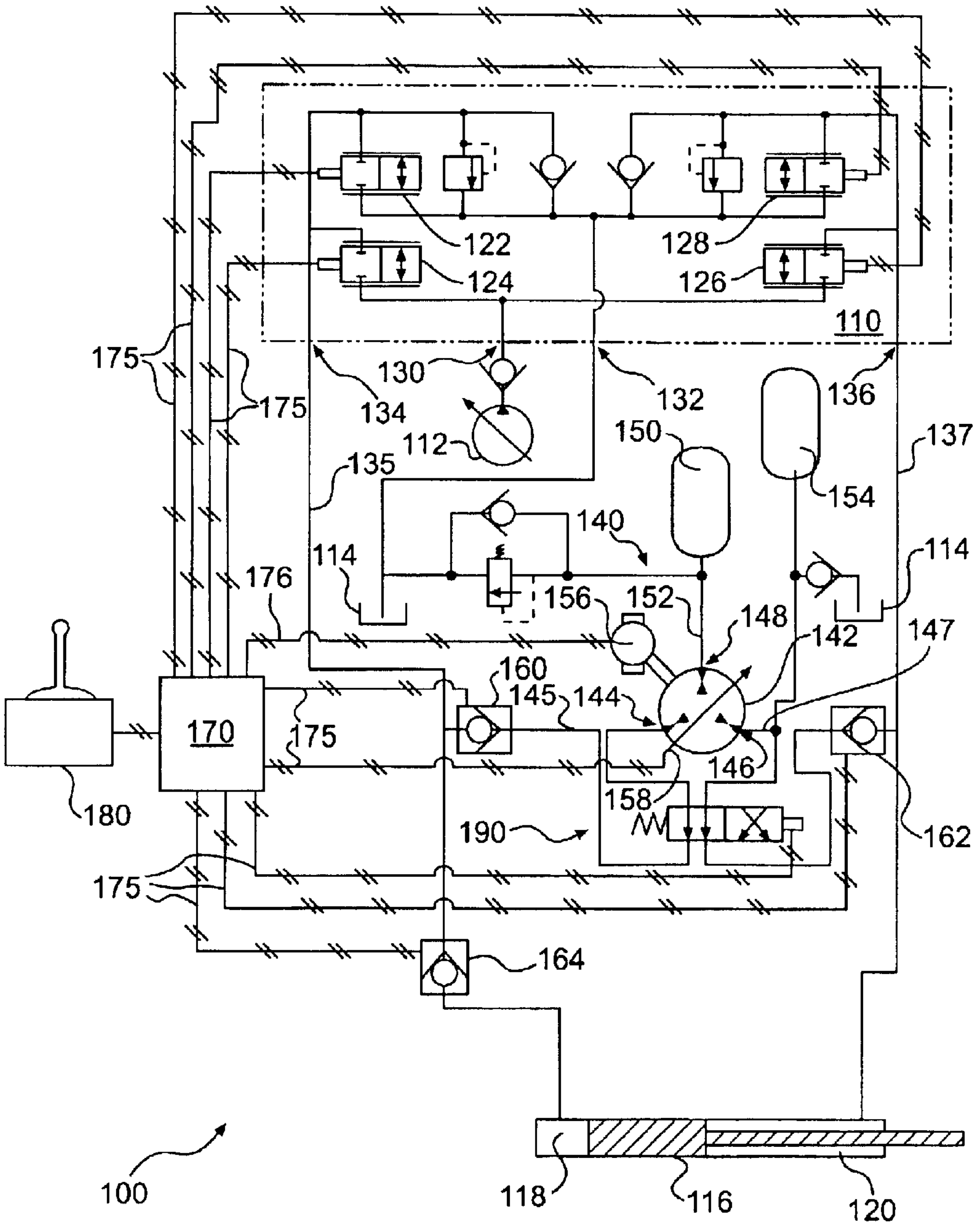
FIG. 1 is a schematic illustration of a hydraulic circuit in accordance with one embodiment of the present invention.

Referring to FIG. 1, a fluid control system, for example, hydraulic circuit 100, includes a valve assembly 110, for example, an independent metering valve arrangement, a pump 112, a tank 114, and an actuator, for example, double-acting hydraulic cylinder 116. The hydraulic cylinder 116 may have a head end chamber 118 and a rod end chamber 120. The pump 112 may be, for example, a variable-displacement, high pressure pump.

The independent metering valve arrangement includes valves configured to control flow to and from the hydraulic cylinder 116. For example, the valve arrangement may include a plurality of independently-operated, electronically-controlled metering valves 122, 124, 126, 128. The metering valves 122, 124, 126, 128 control fluid flow between the pump 112, the tank 114, and the hydraulic cylinder 116. The metering valves may be spool valves, poppet valves, or any other type of flow control valve that would be appropriate. The metering valves may be referred to individually as a cylinder-to-tank head end (CTHE) metering valve 122, a pump-to-cylinder head end (PCHE) metering valve 124, a pump-to-cylinder rod end (PCRE) metering valve 126, and a cylinder-to-tank rod end (CTRE) metering valve 128.

The valve assembly 110 includes a pump port 130 in fluid communication with the pump 112 and a tank port 132 in fluid communication with the tank 114. The valve assembly 110 includes a head end control port 134 in fluid communication with the head end chamber 118 via a head end flow line 135 and a rod end control port 136 in fluid communication with the rod end chamber 120 via the rod end flow line 137.

The hydraulic control system 100 may also include an energy recovery circuit 140 fluidly coupled to the hydraulic cylinder 116 in parallel with the control ports of the valve assembly 110. That is, the energy recovery circuit 140 and the valve assembly 110 may operate with the hydraulic cylinder 116 jointly or individually. The energy recovery circuit 140 includes a hydraulic transformer configured to transform a first fluid flow of a first pressure to a second fluid flow of a second pressure by supplying or discharging a third fluid flow at a low pressure, such as that disclosed in U.S.

Pat. No. 6,223,529. The three fluid flows enter or exit the transformer through what are generally referred to as the high pressure, intermediate pressure, and low pressure ports, and no external drive source is provided to mechanically oscillate the pistons within the transformer. Referring to FIG. 1, a two quadrant hydraulic pressure transformer 142 may be provided according to a first embodiment. The two-quadrant hydraulic transformer 142 may perform regenerative braking in one direction, that is, the transformer 142 may recover energy during retraction of the cylinder 116, and may supply energy during extension of the cylinder 116.

The hydraulic transformer 142 may include an intermediate pressure port 144, a low pressure port 146, and a high pressure port 148. A second head end flow line 145 may provide fluid communication between the intermediate pressure port 144 of the transformer 142 and the head end flow line 135. A second rod end flow line 147 may provide fluid communication between the low pressure port 146 of the transformer 142 and the rod end flow line 137.

The energy recovery circuit 140 may also include an energy storage device, for example, a high pressure accumulator 150 configured to store high pressure fluid being recovered from the cylinder 116. The high pressure accumulator 150 may be in fluid communication with the high pressure port 148 via a high pressure flow line 152. The energy recovery circuit 140 may also include an energy storage device, for example, a low pressure accumulator 154 in fluid communication with the low pressure port 146, to insure availability of an adequate fluid supply to the transformer 142.

A sensor 156 may be provided to sense the rate and direction of rotation of the transformer rotor (not shown). The hydraulic transformer 142 may also include a conventional adjustment device 158 to adjust the angle of the port plate, and thereby control the flow/pressure ratios provided by the transformer in a known manner. In the case of a two quadrant hydraulic transformer, the port plate can not be adjusted over center, that is, the high pressure and low pressure ports can not be reversed. The present invention alternatively contemplates provision of a four quadrant hydraulic transformer, as discussed hereinafter.

The hydraulic control system 100 may include a head check valve 160 and a rod check valve 162, each configured to cut off fluid communication between the energy recovery circuit 140 and the actuating cylinder 116. The hydraulic control system 100 may also include a load check valve 164 associated with the head end flow line 135. The load check valve 164 is configured to prevent the hydraulic cylinder 116 from undesired retraction in the absence of fluid pressure in the head end flow line 135.

The hydraulic control system 100 may further include a controller 170 and an operator input device 180. The sensor 156 as well as other optional sensors (not shown) associated with other components of the hydraulic system 100 may be configured to communicate with the controller 170. The input device 180 also communicates with the controller and allows an operator to control the hydraulic circuit 100. For example, the input device 180 allows the operator to input a command to lift a load, for example, a shovel on a work arm. Alternatively, the input device 180 may represent a source of input commands from, for example, a computer used to automatically control the hydraulic cylinder 116 without an operator.

As shown in FIG. 1, the controller 170 may communicate electronically with the input device 180, the metering valves 122, 124, 126, 128, the hydraulic transformer 142, the sensor 156, and/or the check valves 160, 162, 164. The controller 170 may receive information from the input device 180, for example, a lift or lower command, as well as from the sensor 156. Based on the commands from the input device 180 and the sensor 156 via inputs 176, the controller 170 may determine a desired operation for the hydraulic circuit 100 and an appropriate set of outputs 175 to the metering valves 122, 124, 126, 128, the hydraulic transformer 142, and/or the check valves 160, 162, 164. In one embodiment, the outputs 175 may represent electrical currents.

Optionally, the hydraulic control system 100 having the two quadrant hydraulic transformer 142 may include a directional control valve assembly 190. The directional control valve assembly 190 provides the ability to perform regenerative braking in two directions, that is, the transformer 142 may recover energy during retraction and extension of the cylinder 116 and supply energy during retraction and extension of the cylinder 116.

Figure 2:
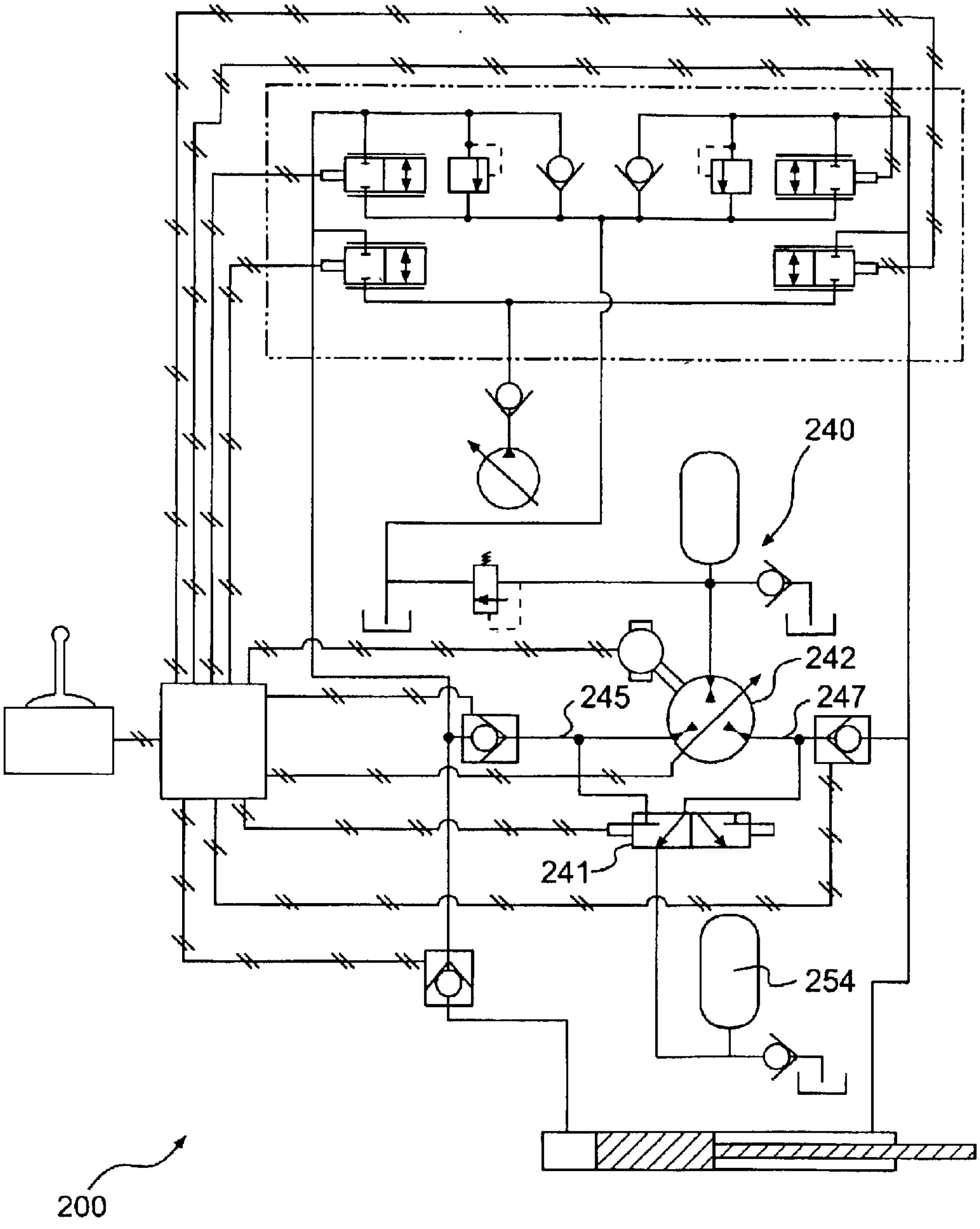
FIG. 2 is a schematic illustration of a hydraulic circuit in accordance with another embodiment of the present invention.

Referring now to FIG. 2, a hydraulic circuit 200 may include energy recovery circuit 240 having a four quadrant hydraulic pressure transformer 242. Consequently, the hydraulic circuit 200 may perform regenerative braking in two directions, without the need for a directional control valve assembly. That is, the transformer 242 may recover energy during retraction and extension of the cylinder 116 and supply energy during retraction and extension of the cylinder 116. The hydraulic transformer 242 may be more sophisticated and somewhat more expensive than the transformer described with respect to FIG. 1. For example, the port plate (not shown) of the hydraulic transformer 242 rotates over center, resulting in positive and negative port plate angles.

The energy recovery circuit 240 may also include a valve, for example, a two-position, three-port valve 241. The valve 241 may selectively provide fluid communication between the low pressure accumulator 254 and either the second head flow line 245 and the second rod end flow line 247. Thus, the valve 241 may enable four quadrant operation of the transformer 242.

It should be appreciated that the exemplary transformers 142, 242 may be replaced by any other pressure transformer operating independently of a mechanical energy source and known to those skilled in the art.

INDUSTRIAL APPLICABILITY

In use, the metering valves 122, 128 may control cylinder-to-tank fluid flow while the metering valves 124, 126 may control pump-to-cylinder fluid flow. Conventional extension of the hydraulic cylinder 116 may be achieved, for example, by selective, operator-controlled actuation of the metering valves 124, 128, and retraction of the cylinder 116 may be achieved, for example, by selective, operator-controlled actuation of the metering valves 122, 126.

The energy recovery circuits 140, 240 provide the ability to recover energy during certain modes of operation of the hydraulic circuits 100, 200. Control signals are provided to the rod check valve 162, load check valve 164, head check valve 160, and port plate angle to implement the exemplary modes of operation described hereafter. For example, an "OFF" signal may translate to normal check valve operation, and an "ON" signal may translate to an open check valve position that allows reverse flow through the check valve. The conventional adjustment device 158 may be used to adjust the port plate angle.

The direction of fluid flow through the high pressure port 148, head end port 144, and rod end port 146 of the hydraulic transformer 142 depend upon the mode of operation. For example, in operational modes pertaining to "retract overrunning" conditions, the load check valve 164 and the head check valve 160 may be held open to allow fluid leaving the head end chamber 118 via the head end flow line 135 to enter the energy recovery circuit 140 and the head end port 144 of the hydraulic transformer 142. Thus, modes pertaining to "retract overrunning" conditions may use the energy recovery circuit 140 to recover energy from fluid exiting the hydraulic cylinder 116 via the head end flow line 135. In these exemplary modes of operation, energy may be stored to the high pressure accumulator 150.

In another example, in operational modes pertaining to "extend resistive" and "extend quickdrop" conditions, the pressurized fluid exiting the head end port 144 of the hydraulic transformer 142 may extend or assist the valve assembly 110 with extending the hydraulic cylinder 116. Thus, modes pertaining to "extend resistive" and "extend quickdrop" conditions may use the energy recovery circuit 140 to supply pressurized fluid to the head end chamber 118 the hydraulic cylinder 116 via the head end flow line 135. In these exemplary modes of operation, energy stored in the high pressure accumulator 150 may be used to supply pressurized fluid to the head end chamber 118 via the head end flow line 135.

The energy recovery circuit 240 shown in FIG. 2 may recover energy from fluid exiting the hydraulic cylinder 116 via the head end flow line 135 during "retract overrunning" modes of operation, as described above. Additionally, the energy recovery circuit 240 may recover energy during exemplary "extend overrunning" modes of operation. In these modes of operation, energy may be stored to the high pressure accumulator 150 from fluid exiting the rod end chamber 120 via the rod end flow line 137, through the opened rod check valve 162, and into the rod end port 146 of the hydraulic transformer 242.

Similarly, the energy recovery circuit 242 may use energy stored in the high pressure accumulator 150 to supply pressurized fluid to the head end chamber 118 via the head end flow line 135 during the "extend resistive" and "extend quickdrop" modes of operation, as described above. In addition, the energy recovery circuit 240 may use energy stored in the high pressure accumulator 150 to supply pressurized fluid to the rod end chamber 120 during the exemplary "retract resistive" and "retract quickdrop" modes of operation. In these modes of operation, the pressurized fluid may be supplied to the rod end chamber 120 of the hydraulic cylinder 116 via the rod end flow line 137. In these three exemplary modes of operation, the pressurized fluid exiting the rod end port 146 of the hydraulic transformer may retract or assist valve assembly 110 with retracting the hydraulic cylinder 116

It should be appreciated that the controller 170 may close the head check valve 160 and the rod check valve 162, such that the energy recovery circuit 140, 240 is by-passed. In this situation, the hydraulic cylinder 116 may be operated by the valve assembly 110 without assistance and/or energy recovery from the energy recovery circuit 140, 240.

Thus, the present invention provides a hydraulic control system having energy recovery capability. The control system may provide the energy recovery in an efficient and effective manner and/or extend the useful life of the working hydraulic fluid. Thus, the control system may offer a cost savings and/or simplify operation of a mobile handling machine.

As shown in FIGS. 1 and 2, the operation of an exemplary embodiment of this invention may be implemented on a controller 170. The controller 170 may include a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine is capable of implementing, for example, the aforementioned operations can be used to implement the controller functions of this invention.

It will be apparent to those skilled in the art that various modifications and variations can be made in the hydraulic control system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A fluid control system, comprising:

a pump;

a tank;

an actuator;

a valve assembly configured to control fluid communication between the actuator, the tank, and the pump; and an energy recovery circuit including a pressure transformer and an energy storage device, the energy recovery circuit being fluidly coupled to the actuator in parallel with the valve assembly, wherein the energy recovery circuit is configured to receive pressurized fluid flowing from the actuator and to store the pressurized fluid to the energy storage device.

2. The system of claim 1, wherein the valve assembly includes an independent metering valve arrangement.

3. The system of claim 1, wherein the actuator includes a head end chamber and a rod end chamber, and wherein the valve assembly includes a first valve configured to control fluid communication between the head end chamber and the tank, a second valve configured to control fluid communication between the head end chamber and the pump, a third valve configured to control fluid communication between the rod end chamber and the pump, and a fourth valve configured to control fluid communication between the rod end chamber and the tank.

4. The system of claim 1, wherein the actuator includes a head end chamber and a rod end chamber, and wherein the pressure transformer includes a head end port, a rod end port, and a high pressure port, the head end port being in fluid communication with the head end chamber, the rod end port being in fluid communication with the rod end chamber, and the high pressure port being in fluid communication with the energy storage device.

5. The system of claim 1, wherein the pressure transformer is a two quadrant hydraulic pressure transformer.

6. A fluid control system, comprising:

a pump;

a tank;

an actuator;

a valve assembly configured to control fluid communication between the actuator, the tank, and the pump; and an energy recovery circuit including a pressure transformer and an energy storage device, the energy recovery circuit being fluidly coupled to the actuator in parallel with the valve assembly, wherein the actuator includes a head end chamber and a rod end chamber, wherein the pressure transformer includes a head end port, a rod end port, and a high pressure port, the head end port being in fluid communication with the head end chamber, the rod end port being in fluid communication with the rod end chamber, and the high pressure port being in fluid communication with the energy storage device, and wherein the energy recovery circuit is configured to receive pressurized fluid flowing from at least one of the head end chamber and the rod end chamber and to store the pressurized fluid to the energy storage device.

7. The system of claim 6, wherein the energy recovery circuit is configured to supply pressurized fluid from the energy storage device to at least one of the head end chamber and the rod end chamber.

8. The system of claim 7, wherein the energy recovery circuit is configured to assist the valve assembly in operating the actuator.

9. The system of claim 7, wherein the energy recovery circuit is configured to operate the actuator independently of the valve assembly.

10. A fluid control system, comprising:

a pump;

a tank;

an actuator;

a valve assembly configured to control fluid communication between the actuator, the tank, and the pump; and an energy recovery circuit including a pressure transformer, the energy recovery circuit being fluidly coupled to the actuator in parallel with the valve assembly, wherein the pressure transformer is a four quadrant hydraulic pressure transformer.

11. A fluid control system, comprising:

a pump;

a tank;

an actuator;

an independent metering valve arrangement configured to control fluid communication between the actuator, the tank, and the pump; and an energy recovery circuit being fluidly coupled to the actuator in parallel with the independent metering valve arrangement.

12. The system of claim 11, wherein the actuator includes a head end chamber and a rod end chamber, and wherein the independent metering valve arrangement includes a first valve configured to control fluid communication between the head end chamber and the tank, a second valve configured to control fluid communication between the head end chamber and the pump, a third valve configured to control fluid communication between the rod end chamber and the pump, and a fourth valve configured to control fluid communication between the rod end chamber and the tank.

13. The system of claim 11, wherein the energy recovery circuit includes a pressure transformer and an energy storage device.

14. The system of claim 13, wherein the actuator includes a head end chamber and a rod end chamber, and wherein the pressure transformer includes a head end port, a rod end port, and a high pressure port, the head end port being in fluid communication with the head end chamber, the rod end port being in fluid communication with the rod end chamber, and the high pressure port being in fluid communication with the high pressure chamber.

15. The system of claim 14, wherein the energy recovery circuit is configured to receive pressurized fluid flowing from at least one of the head end chamber and the rod end chamber and to store the pressurized fluid to the energy storage device.

16. The system of claim 15, wherein the energy recovery circuit is configured to supply pressurized fluid from the energy storage device to at least one of the head end chamber and the rod end chamber.

17. The system of claim 16, wherein the energy recovery circuit is configured to assist the independent metering valve arrangement in operating the actuator.

18. The system of claim 16, wherein the energy recovery circuit is configured to operate the actuator independently of the independent metering valve arrangement.

19. A method of operating a fluid control system including a pump, a tank, and an actuator having a head end chamber and a rod end chamber, the method comprising:

operating a valve assembly to control fluid communication between the actuator, the tank, and the pump;

receiving a first fluid flow from one of the head end chamber and the rod end chamber;

transforming the first fluid flow of a first pressure to a second fluid flow of a second pressure by supplying or discharging a third fluid flow of a third pressure; and directing the second fluid flow to an energy storage device.

20. The method of claim 19, further including supplying pressurized fluid from the energy storage device to at least one of the head end chamber and the rod end chamber.

21. A fluid control system, comprising:

a pump;

a tank;

an actuator;

a valve assembly configured to control fluid communication between the actuator, the tank, and the pump; and an energy recovery circuit including a pressure transformer, the energy recovery circuit being fluidly coupled to the actuator in parallel with the valve assembly, wherein the valve assembly includes an independent metering valve arrangement.

22. A fluid control system, comprising:

a pump;

a tank;

an actuator;

a valve assembly configured to control fluid communication between the actuator, the tank, and the pump; and an energy recovery circuit including a pressure transformer, the energy recovery circuit being fluidly coupled to the actuator in parallel with the valve assembly, wherein the actuator includes a head end chamber and a rod end chamber, and wherein the valve assembly includes a first valve configured to control fluid communication between the head end chamber and the tank, a second valve configured to control fluid communication between the head end chamber and the pump, a third valve configured to control fluid communication between the rod end chamber and the pump, and a fourth valve configured to control fluid communication between the rod end chamber and the tank.

* * * * *